United States Patent
Jonokuchi et al.

(10) Patent No.: US 6,877,584 B2
(45) Date of Patent: Apr. 12, 2005

(54) ELECTRICALLY OPERATED POWER STEERING DEVICE

(75) Inventors: Hideki Jonokuchi, Nara (JP); Yoshiyuki Yamazaki, Nara (JP)

(73) Assignee: Koyo Seiko Co., Ltd., Osaka (JP)

( * ) Notice: Subject to any disclaimer, the term of this patent is extended or adjusted under 35 U.S.C. 154(b) by 0 days.

(21) Appl. No.: 10/290,262

(22) Filed: Nov. 8, 2002

(65) Prior Publication Data

US 2003/0111291 A1 Jun. 19, 2003

(30) Foreign Application Priority Data

Nov. 12, 2001 (JP) .................................... P2001-346527

(51) Int. Cl.$^7$ ................................................ B62D 5/04
(52) U.S. Cl. ........................................ 180/446; 701/42
(58) Field of Search ................................ 180/443–446; 701/41, 42; 318/139, 432, 434

(56) References Cited

U.S. PATENT DOCUMENTS

| | | | | |
|---|---|---|---|---|
| 4,875,539 A | * | 10/1989 | Abukawa et al. | 180/446 |
| 5,202,830 A | * | 4/1993 | Tsurumiya et al. | 701/41 |
| 5,758,741 A | * | 6/1998 | Tomioka | 180/446 |
| 6,052,633 A | * | 4/2000 | Fukuyama et al. | 701/41 |
| 6,246,197 B1 | * | 6/2001 | Kurishige et al. | 318/432 |
| 6,502,024 B2 | * | 12/2002 | Ishihara et al. | 701/41 |
| 2001/0023383 A1 | | 9/2001 | Ishihara et al. | |

* cited by examiner

Primary Examiner—Lesley D. Morris
Assistant Examiner—Matthew Luby
(74) Attorney, Agent, or Firm—McGinn & Gibb, PLLC (57) ABSTRACT

A microcomputer calculates a command value for feedback control based on a target electric current value set on the basis of steering torque and a vehicle speed, and the detecting value of a motor electric current. The microcomputer calculates the duty ratio of a PWM signal for turning on and off a switching element of a motor driving circuit from this command value. When this calculated duty ratio is 100% or less, no voltage raising circuit is operated and a battery voltage is supplied to the motor driving circuit. In contrast to this, when the calculated duty ratio Dc exceeds 100%, the microcomputer outputs the PWM signal for turning on and off the switching element of the voltage raising circuit in the duty ratio according to this excess amount. Thus, the battery voltage is raised in accordance with this excess amount and is supplied to the motor driving circuit.

12 Claims, 7 Drawing Sheets

GENERATION OF BACK FLOW PHENOMENON

FIG. 9

ELECTRICALLY OPERATED POWER STEERING DEVICE

BACKGROUND OF THE INVENTION

The present invention relates to an electrically operated power steering device for giving steering auxiliary force to the steering mechanism of a vehicle by driving an electric motor in accordance with steering torque applied to an operation unit for vehicle steering, and more particularly, relates to a voltage raising circuit for generating a voltage to be applied to the electric motor by raising a battery voltage in such an electrically operated power steering device.

The electrically operated power steering device for giving the steering auxiliary force to the steering mechanism by driving the electric motor in accordance with steering torque applied to a handle (steering wheel) by a driver is conventionally used. In this electrically operated power steering device, a torque sensor for detecting the steering torque applied to the handle as an operation unit for steering is arranged, and a target value of an electric current to be flowed to the electric motor is set on the basis of the steering torque detected by this torque sensor. A command value to be given to a driving unit of the electric motor is generated on the basis of the deviation between this target value and the value of the electric current really flowed to the electric motor. For example, the driving unit of the electric motor is constructed by a PWM signal generating circuit for generating a pulse width modulating signal (PWM signal) of a duty ratio according to this command value, and a motor driving circuit constructed by using a power transistor turned on and off in accordance with the duty ratio of this PWM signal. The voltage according to this duty ratio, i.e., the voltage according to the command value, is applied to the electric motor. The electric current flowed to the electric motor by this voltage application is detected by an electric current detector. The difference between this detecting value and the target value is used as the deviation for generating the command value. In the electrically operated power steering device, feedback control is performed such that the electric current of the target value thus set on the basis of the steering torque is flowed to the electric motor.

Figure 9:
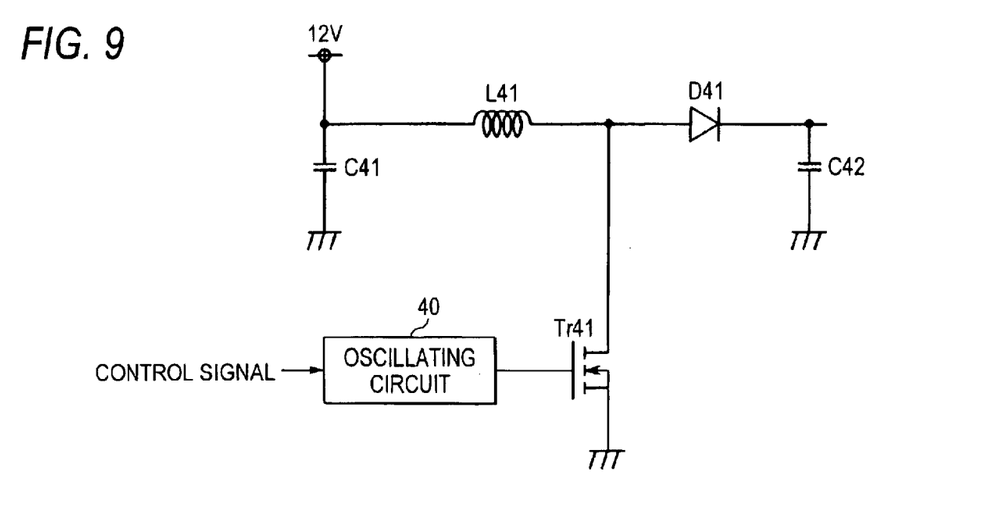
FIG. 9 is a circuit diagram showing the construction of a conventional voltage raising circuit.

In such an electrically operated power steering device, a construction for further adding a voltage raising circuit for raising and supplying the voltage of the battery is known. Various constructions are considered in this voltage raising circuit. FIG. 9 is a circuit diagram showing one example of the voltage raising circuit. This voltage raising circuit includes an oscillating circuit 40 for inputting a control signal thereto from the exterior and outputting a pulse wave according to this control signal, a transistor Tr41 to which this pulse wave is input and which performs a switching operation according to this pulse wave, a coil L41 for repeating the accumulation and discharge of energy by this switching operation, and capacitors C41, C42. This voltage raising circuit makes the transistor Tr41 perform the switching operation by the pulse wave from the oscillating circuit 40, and the energy in the coil L41 is repeatedly accumulated and discharged by turning on and off the electric current flowed to the coil L41. Thus, a high voltage is repeatedly generated on the cathode terminal side of a diode D41, and a smoothed raised voltage is generated by the capacitor C42. In accordance with such a construction, larger torque is obtained by applying the raised voltage to the motor.

A voltage drop in the forward direction in the diode used in the voltage raising circuit is set to 0.6 to 0.7 V and is large. Therefore, a voltage raising circuit using a MOS (metallic oxide semiconductor) type transistor (hereinafter simply called "MOS") having a small voltage drop instead of the diode is known. In such a circuit construction, the MOS is replaced with the diode by making a source terminal and a drain terminal of the MOS correspond to an anode terminal and a cathode terminal of the diode D41, respectively, in the voltage raising circuit (see a main voltage raising section 31 of FIG. 5 described later with respect to a constructional example). If this MOS is operated by giving a pulse wave to the gate terminal of the MOS so as to be reciprocally turned on and off with respect to the turning on and off of the transistor Tr41, similar to the case of the diode, a high voltage can be repeatedly generated on the drain terminal side of the MOS.

However, since the raised voltage is basically supplied at any time in the voltage raising circuit used in the electrically operated power steering device, switching loss, etc. based on the switching operation of the transistor are always generated. As this result, a problem exists in that energy loss is increased.

When an ON-period of the MOS becomes longer than a predetermined time in the voltage raising circuit using the MOS instead of the diode, the electric potential on the drain terminal side becomes higher than that on the source terminal side. Therefore, the phenomenon (hereinafter called a "back flow phenomenon") that the electric current is flowed backward from the drain terminal side to the source terminal side, is caused. A problem exists in that heat is generated in the MOS and voltage raising efficiency is reduced by this back flow phenomenon.

Further, for example, when the motor is suddenly moved by external force by dropping a wheel to a groove, etc., the motor attains an electricity generating state. When the MOS is turned off at this time, a problem exists in that electric current to be fed back to the battery is not ted back and the danger of internal damage is caused.

SUMMARY OF THE INVENTION

Therefore, an object of the present invention is to provide an electrically operated power steering device having a voltage raising circuit operated so as to reduce the switching loss as much as possible. Further, another object of the present invention is to provide an electrically operated power steering device having the voltage raising circuit using the MOS operated such that the heat generation and the reduction in voltage raising efficiency due to the back flow phenomenon are prevented, and no danger of the internal damage is caused even when the motor is in the electricity generating state.

In order to solve the aforesaid object, the invention is characterized by having the following arrangement.

(1) An electrically operated power steering device for giving steering auxiliary force to a steering mechanism of a vehicle by driving an electric motor in accordance with steering torque applied to an operation unit for vehicle steering, the electrically operated power steering device comprising:
  a steering state detecting unit for detecting a steering state in the vehicle steering;
  an electric current detecting unit for detecting an electric current flowed to the electric motor and outputting a detecting value of the electric current;
  a motor driving unit for driving the electric motor in accordance with a first command value;

a voltage raising unit for raising a voltage to be supplied to the motor driving unit in accordance with a second command value;

a motor driving control unit for calculating a command value for feedback control of the electric motor as the first command value on the basis of a deviation between a target electric current value set on the basis of the steering torque to the electric motor and the detecting value of the electric current flowed to the electric motor, and giving the first command value to the motor driving unit; and a voltage raising control unit for calculating the second command value such that the voltage raising unit is not operated when the calculated first command value is a predetermined threshold value or less, and the voltage raising unit raises the voltage in accordance with the steering state when the calculated first command value exceeds the threshold value, and giving the second command value to the voltage raising unit.

(2) The electrically operated power steering device according to (1), wherein the motor driving unit drives the electric motor on the basis of a first PWM signal changed in duty ratio in accordance with the first command value, the motor driving control unit calculates the duty ratio to be provided for the first PWM signal on the basis of the first command value, and the voltage raising control unit calculates the second command value such that the voltage raising unit raises the voltage only when the duty ratio calculated by the motor driving control unit exceeds 100% or a predetermined value close to 100%.

(3) The electrically operated power steering device according to (1), wherein the voltage raising unit includes:
 a first switching element turned on and off in accordance with a second PWM signal changed in pulse width on the basis of the second command value,
 a reactor having a predetermined inductance and connected to a power source at one end and connected to the ground at the other end through the first switching element, and
 a second switching element interposed between the reactor and the motor driving unit, and turned on and off complementarily with the first switching element in accordance with the second PWM signal, and the voltage raising control unit includes:
 a detecting unit for detecting a back flow of the electric current from the motor driving unit to the reactor, and
 a back flow preventing unit for compulsorily turning-off the second switching element when the back flow is detected by the detecting unit.

(4) The electrically operated power steering device according to (1), wherein the voltage raising unit includes:
 a first switching element turned on and off in accordance with a second PWM signal changed in pulse width on the basis of the second command value,
 a reactor having a predetermined inductance and connected to a power source at one end and connected to the ground at the other end through the first switching element, and
 a second switching element interposed between the reactor and the motor driving unit, and turned on and off complementarily with the first switching element in accordance with the second PWM signal, and the voltage raising control unit includes:
 a detecting unit for detecting whether the electric motor is in an electricity generating state or not, and
 a feedback unit for compulsorily turning-on the second switching element to feed-back the electric current from the electric motor to the power source when it is detected by the detecting unit that the electric motor is in the electricity generating state.

(5) An electrically operated power steering device comprising:

an electric motor for giving steering auxiliary force to a steering mechanism of a vehicle;

a steering state detecting unit for detecting a steering state in a vehicle steering of the vehicle;

a motor drive unit for driving the electric motor;

a motor driving control unit for calculating a target value of an electric current to be supplied to the electric motor on the basis of the steering state detected by the steering state detecting unit and controlling the motor drive unit on the basis of the target value;

a voltage raising unit for raising a voltage to be supplied to the motor driving unit; and a voltage raising control unit for driving the voltage raising unit only when the target value exceeds a predetermined value.

(6) The electrically operated power steering device according to (5) further comprising an electric current detecting unit for detecting an electric current flowed to the electric motor, wherein the target value is calculated on the basis of the detected steering state and the electric current detected by the electric current detecting unit.

(7) The electrically operated power steering device according to (5), wherein the motor drive unit is controlled by a PWM signal changed in duty ratio in accordance with the target value, (8) The electrically operated power steering device according to (7), wherein when the duty ratio of the PWM signal exceeds 100% or a predetermined value close to 100%, the voltage raising control unit drives the voltage raising unit.

(9) The electrically operated power steering device according to (8), wherein the voltage raised by the voltage raising unit is changed in accordance with an excess amount of the duty ratio over 100% or the predetermined value closed to 100%.

In accordance with the invention, switching loss, etc. in a voltage raising circuit are reduced and energy loss can be restrained by constructing the voltage raising circuit such that no voltage raising circuit is operated until the first command value becomes the predetermined threshold value or more.

In accordance with the invention, energy loss can be restrained to the minimum by constructing the voltage raising circuit such that no voltage raising circuit is operated until the duty ratio calculated on the basis of the first command value is 100% or a predetermined value or more close to 100%.

In accordance with the invention, when a back flow phenomenon is caused, the back flow of the electric current can be prevented by turning-off the second switching element. Accordingly, heat generation of the MOS and a reduction in voltage raising efficiency due to this back flow phenomenon can be prevented in advance.

In accordance with the invention, when the motor is in the electricity generating state and an excessive voltage is caused, the electric current is fed back to the battery at any time by turning-on the second switching element. Accordingly, the danger of generation of internal loss can be prevented in advance.

DETAILED DESCRIPTION OF PREFERRED EMBODIMENTS

Figure 1:
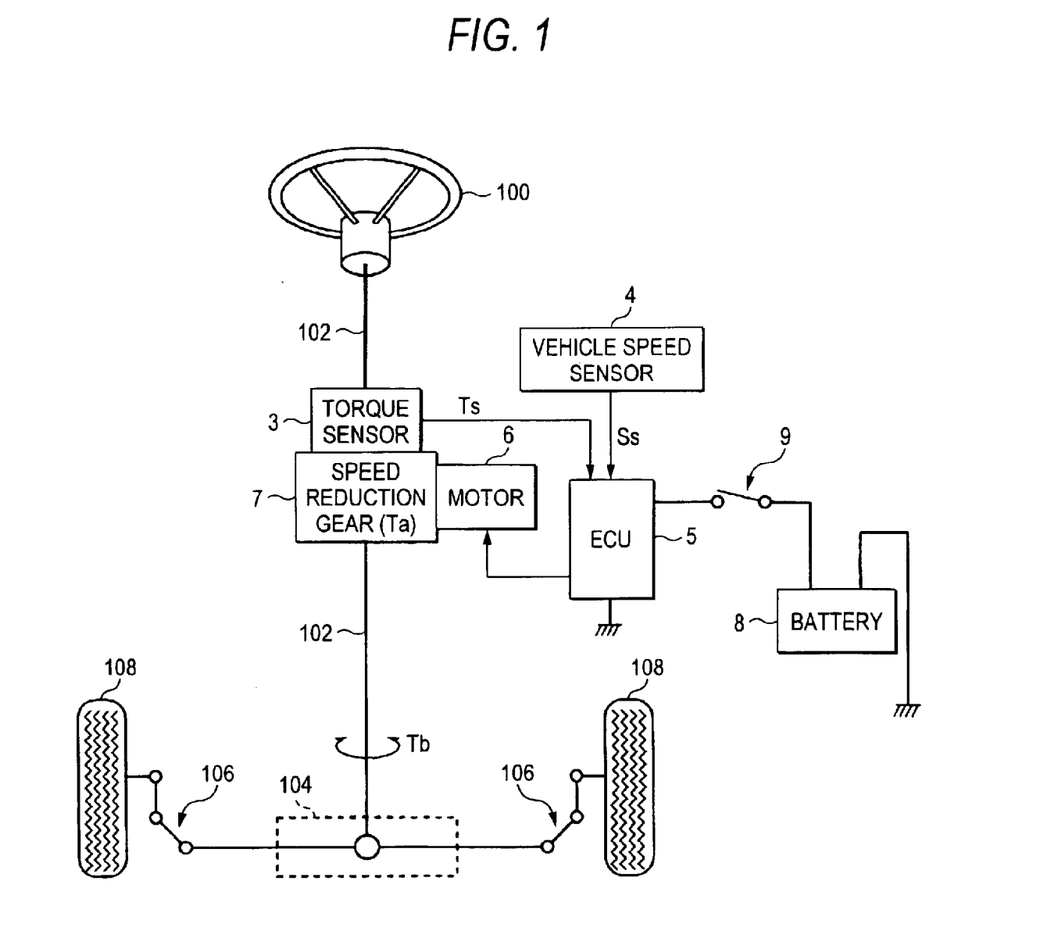
FIG. 1 is a schematic view showing the construction of an electrically operated power steering device in accordance with one embodiment of the present invention together with a vehicle construction related to this device construction.

The embodiment of the present invention will next be described with reference to the accompanying drawings.
<1. Entire Construction>
FIG. 1 is a schematic view showing the construction of an electrically operated power steering device in accordance with an embodiment of the present invention together with a vehicle construction related to this device construction. This electrically operated power steering device includes a steering shaft 102 having one end fixed to a handle (steering wheel) 100 as an operation unit for steering, a rack pinion mechanism 104 connected to the other end of this steering shaft 102, a torque sensor 3 for detecting steering torque applied by operating the handle 100 to the steering shaft 102, an electric motor 6 for generating steering auxiliary force for reducing the load of a driver due to the handle operation (steering operation), a speed reduction gear 7 for transmitting the steering auxiliary force generated by this motor 6 to the steering shaft 102, and an electronic control unit (ECU) 5. The electronic control unit (ECU) 5 receives the supply of power from a battery 8 mounted to the vehicle through an ignition switch 9, and controls the operation of the motor 6 based on a sensor signal from the torque sensor 3 and the vehicle speed sensor 4.

When the driver operates the handle 100 in the vehicle mounting such an electrically operated power steering device thereto, the steering torque provided by this operation is detected by the torque sensor 3, and the motor 6 is driven by the ECU 5 on the basis of a detecting value Ts of this steering torque and a vehicle speed detected by the vehicle speed sensor 4. Thus, the motor 6 generates the steering auxiliary force, and this steering auxiliary force is applied to the steering shaft 102 through the speed reduction gear 7 so that the load of the driver due to the steering operation is reduced. Namely, the sum of the steering torque Ta applied by the handle operation and torque (hereinafter called "steering auxiliary torque") Ta provided by the steering auxiliary force generated by the motor 6 is given as output torque Tb to the rack pinion mechanism 104 through the steering shaft 102. Thus, when a pinion shaft is rotated, its rotation is converted to the reciprocating movement of a rack shaft by the rack pinion mechanism 104. Both ends of the rack shaft are connected to a wheel 108 through a connection member 106 constructed by a tie rod and a knuckle arm, and the direction of the wheel 108 is changed in accordance with the reciprocating movement of the rack shaft.
<2. Construction and Operation of Controller>

Figure 2:
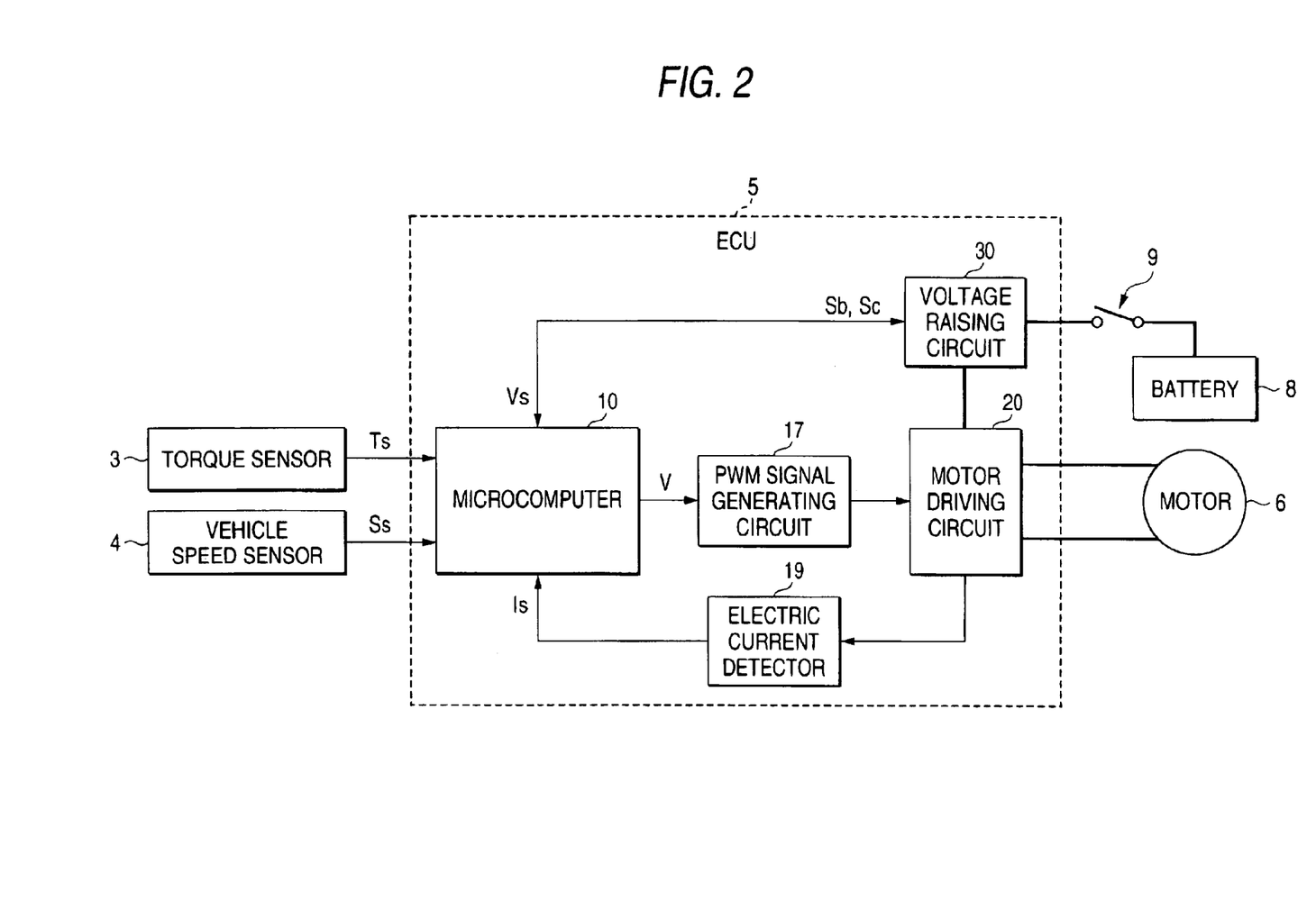
FIG. 2 is a block diagram showing the construction of a controller (ECU) in the electrically operated power steering device in accordance with the embodiment.

FIG. 2 is a block diagram showing the detailed construction of the ECU 5 as a controller of the electrically operated power steering device. This ECU 5 includes a microcomputer 10, a PWM signal generating circuit 17, an electric current detector 19, a motor driving circuit 20 and a voltage raising circuit 30.

The torque sensor 3 detects the steering torque given by operating the handle 100. Namely, in the steering shaft 102, a torsion bar is interposed between a portion on the handle 100 side and a portion to which the steering auxiliary torque Ta is applied through the speed reduction gear 7. The torque sensor 3 detects the steering torque by detecting torsion of this torsion bar. The detecting value Ts of the steering torque detected in this way is output from the torque sensor 3 as a steering torque detecting signal, and is inputted to the microcomputer 10.

The vehicle speed sensor 4 detects the speed of the vehicle mounting this electrically operated power steering device thereto, and outputs a signal showing its detecting value Ss as a vehicle speed signal. This vehicle speed signal is inputted to the microcomputer 10.

The electric current detector 19 detects the electric current really supplied to the motor 6, i.e., the electric current flowed to the motor 6, and outputs an electric current detecting value Is showing this electric current to the microcomputer 10.

The PWM signal generating circuit 17 generates a pulse signal of an output duty ratio Dp according to a command value V generated by the microcomputer 10 described later, i.e., a pulse width modulating signal (hereinafter called a "PWM signal for motor driving") changed in pulse width in accordance with the command value V described later. The function of this PWM signal generating circuit 17 may be realized by the microcomputer 10.

The voltage raising circuit 30 is connected to the battery 8 through the ignition switch 9, and raises the power voltage from the battery 8 in accordance with commands from the microcomputer 10, and supplies the raised voltage to the motor driving circuit 20. The detailed construction and operation of this voltage raising circuit 30 will be described later.

Figure 4:
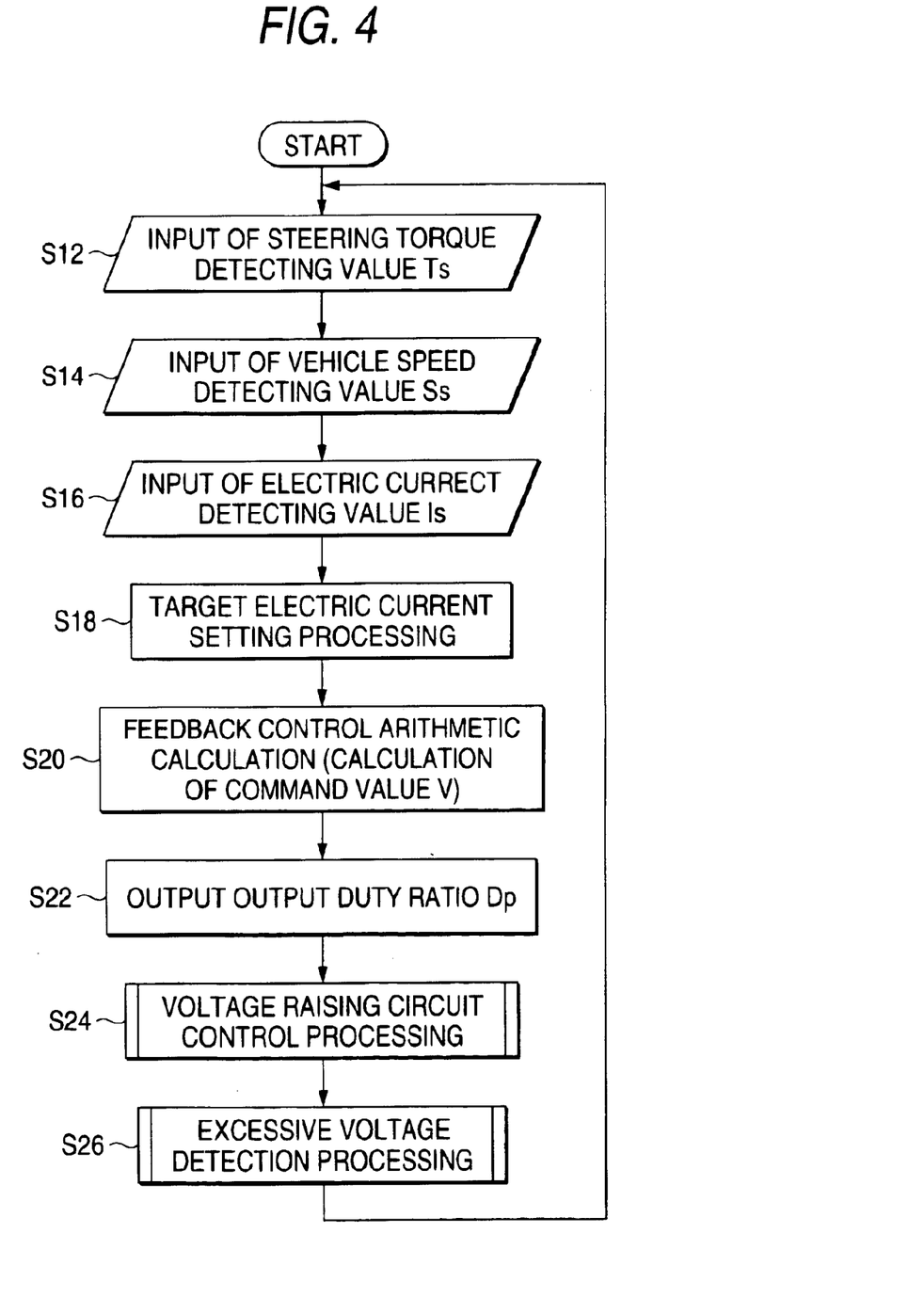
FIG. 4 is a flow chart showing the operation of a microcomputer in the embodiment.

The microcomputer 10 gives the command value v to the PWM signal generating circuit 17 to generate suitable steering auxiliary force on the basis of the steering torque detecting signal Ts, the vehicle speed signal Ss and the electric current detecting value Is inputted above The operation of the microcomputer 10 will next be explained with reference to the flow chart shown in FIG. 4.

First, each of the detecting value Ts of the steering torque, the detecting value Ss of the vehicle speed and the electric current detecting value Is is inputted to the microcomputer 10 (steps S12, S14 and S16). Next, the microcomputer 10 performs phase compensation with respect to the inputted detecting value Ts of the steering torque, and performs processing (hereinafter called "target electric current setting processing) for calculating the value of a target electric current (target electric current value) It to be supplied to the motor 6 on the basis of the value after this phase compensation and the detecting value Ss of the vehicle speed (step S18). Concretely, the microcomputer 10 sets the target electric current value It by referring to a table (called an "assist table") showing the relation of the steering torque and the target electric current value It to be supplied to the motor 6 so as to generate suitable steering auxiliary force with the vehicle speed as a parameter.

Further, the microcomputer 10 calculates the deviation It–Is between the target electric current value It and the electric current detecting value Is outputted from the electric current detector 19. The microcomputer 10 then makes an arithmetic calculation (hereinafter called a "feedback control arithmetic calculation") for generating a command value (hereinafter simply called a "command value") V for feedback control by a proportional integration control arithmetic calculation based on this deviation It–Is (step S20). This command value V is a command value for performing the feedback control based on the deviation It–Is so as to flow the electric current of the target electric current value It to the motor 6, and is given by the following formula (1).

$$V=Kp \cdot (It-Is)+Ki \cdot \int (It-Is)dt \qquad (1)$$

In this formula, Kp is a gain of proportional control in the proportional integration control arithmetic calculation, and Ki is a gain of integral control in the proportional integration control arithmetic calculation. The output duty ratio Dp given to the POM signal generating circuit 17 is calculated on the basis of this command value V. In this case, no output duty ratio Dp can exceed 100% when a signal is generated. Therefore, a duty ratio (hereinafter called a "calculated duty ratio") Dc (first command value) in the calculation for allowing a value exceeding 100% is first calculated on the basis of the command value V. Next, while this calculated duty ratio Dc is normally set to the output duty ratio Dp, the output duty ratio Dp is set to 100% when the calculated duty ratio Dc exceeds 100%.

The microcomputer 10 gives the output duty ratio Dp calculated as mentioned above to the PWM signal generating circuit 17 (step S22).

Next, the microcomputer 10 performs processing (hereinafter called "voltage raising circuit control processing") for controlling the operation of the voltage raising circuit 30 for raising the voltage to be supplied to the motor 6 in accordance with necessity (subroutine step S24). Namely, when the electric current to be supplied to the motor is further required although the output duty ratio Dp is close to a maximum value (100%), it is impossible to perform the feedback control based on the deviation It–Is by using only this output duty ratio Dp. Therefore, the voltage raising circuit is started so as to flow the electric current of the target electric current value It to the motor 6 by applying the raised voltage to the motor 6. The details of such voltage raising circuit control processing will be described later.

Finally, for example, when the motor 6 attains an electricity generating state and an excessive voltage is caused by dropping a wheel to a groove, etc., the microcomputer 10 detects this and performs processing (hereinafter called "excessive voltage detection processing") for controlling the operation of the voltage raising circuit 30 so as to feed the electric current back to the battery 8 (subroutine step S26). Thus, the danger that no electric current to be fed back to the battery is fed back and internal damage is caused, is prevented in advance. This excessive voltage detection processing will be described later. Thus, the microcomputer 10 repeatedly performs the processings of steps S12 to S26 shown in FIG. 4. It is preferable to construct this subroutine step S26 as an independent processing routine and preferentially execute this subroutine step S26 by interruption processing, etc. at an excessive voltage detecting time so as to instantly prevent the danger of the internal damage due to the excessive voltage.

Figure 3:
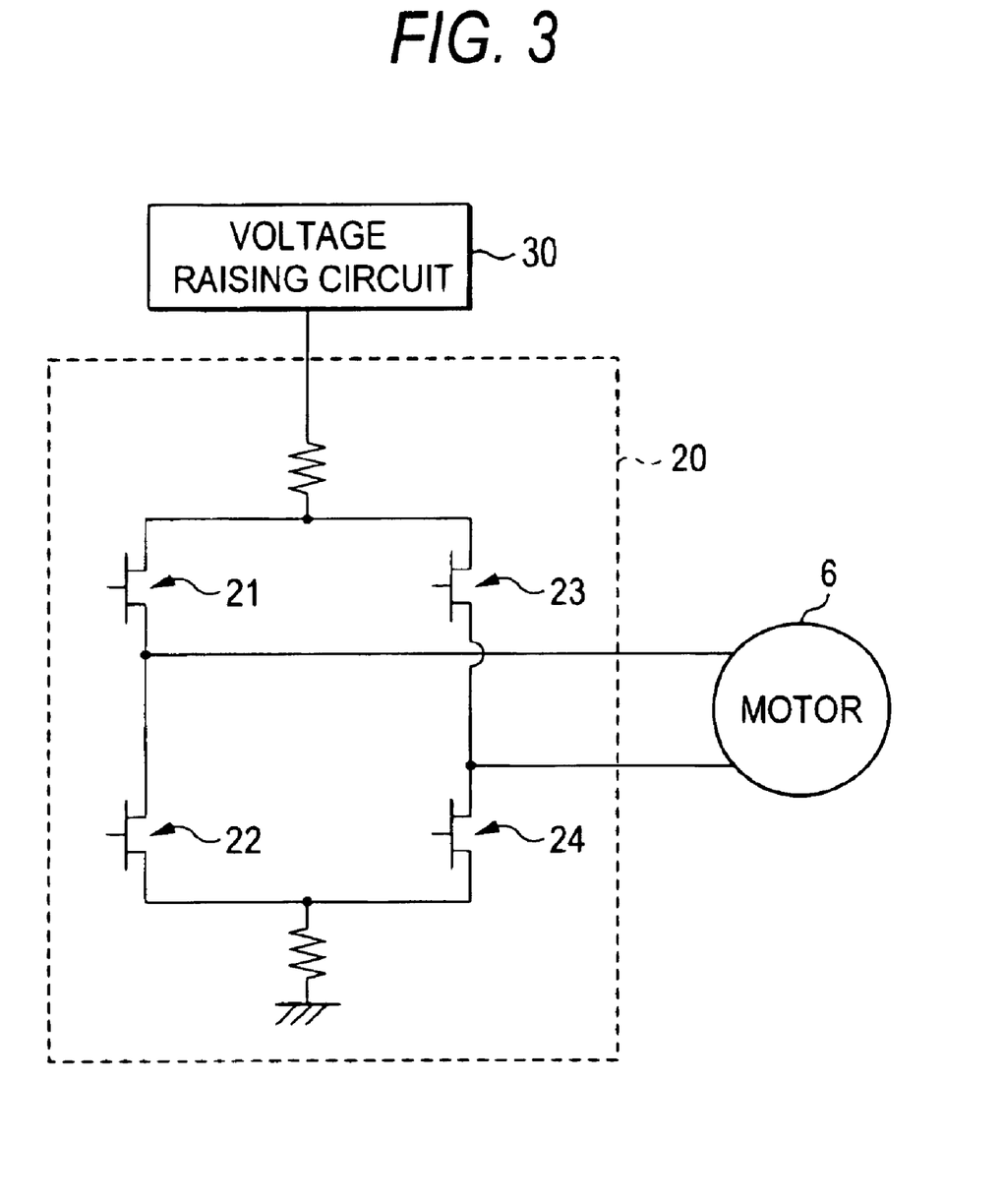
FIG. 3 is a circuit diagram showing the construction of a motor driving circuit in the embodiment.

The motor driving circuit 20 applies the voltage according to the output duty ratio Dp of the PWM signal for motor driving to the motor 6. FIG. 3 is a circuit diagram showing one constructional example of this motor driving circuit 20. In this example, a bridge circuit is constructed by four field effect transistors (hereinafter called "FETs") 21 to 24 for electric power, and is connected between a power line from the voltage raising circuit 30 and a ground connection line. When torque (hereinafter called "rightward direction torque") in a direction for assisting rightward direction steering should be generated in the motor 6, the PWM signal for motor driving is inputted from the PWM signal generating circuit 17 to the gates of FETs 21, 24, and a predetermined signal for turning off FETs 22, 23 is inputted to the gates of these FETs 22, 23. Thus, the FETs 21, 24 are turned on for only a period corresponding to the pulse width of the PWM signal for motor driving, and the voltage of a magnitude according to the command value V is applied to the motor 6. The motor 6 generates the rightward direction torque of a magnitude according to the electric current flowed by this voltage application. In contrast to this, when torque (hereinafter called "leftward direction torque") in a direction for assisting the leftward direction steering should be generated in the motor 6, the PWM signal for motor driving is inputted from the PWM signal generating circuit 17 to the gates of the FETs 22, 23, and a predetermined signal for turning off the FETs 21, 24 is inputted to the gates of the FETs 21, 24. Thus, the FETs 22, 23 are turned on for only a period corresponding to the pulse width of the PWM signal for motor driving, and the voltage of a magnitude according to the command value V is applied to the motor 6. The motor 6 generates the leftward direction torque of a magnitude according to the electric current flowed by this voltage application.

Thus, the electric current is supplied to the motor 6 in accordance with the command value V (or the output duty ratio Dp) given to a motor driving unit constructed by the PWM signal generating circuit 17 and the motor driving circuit 20. The torque of a magnitude according to this electric current is generated from the motor 6. At this time, the electric current supplied to the motor 6, i.e., the electric current flowed to the motor 6 is detected as the electric current detecting value Is by the electric current detector 19, and is inputted to the microcomputer 10, and is used to calculate the deviation It–Is as already described.

Here, when the output duty ratio Dp of the PWM signal for motor driving is close to a maximum value (100%), no value of the electric current flowed to the motor 6 can be increased by changing the output duty ratio Dp. When it is necessary to further supply the electric current to the motor 6, the voltage is raised and given to the motor 6 by the voltage raising circuit 30 in accordance with commands of the microcomputer 10 as already described. The detailed construction and operation of this voltage raising circuit 30 will next be explained with reference to FIG. 5.

Figure 5:
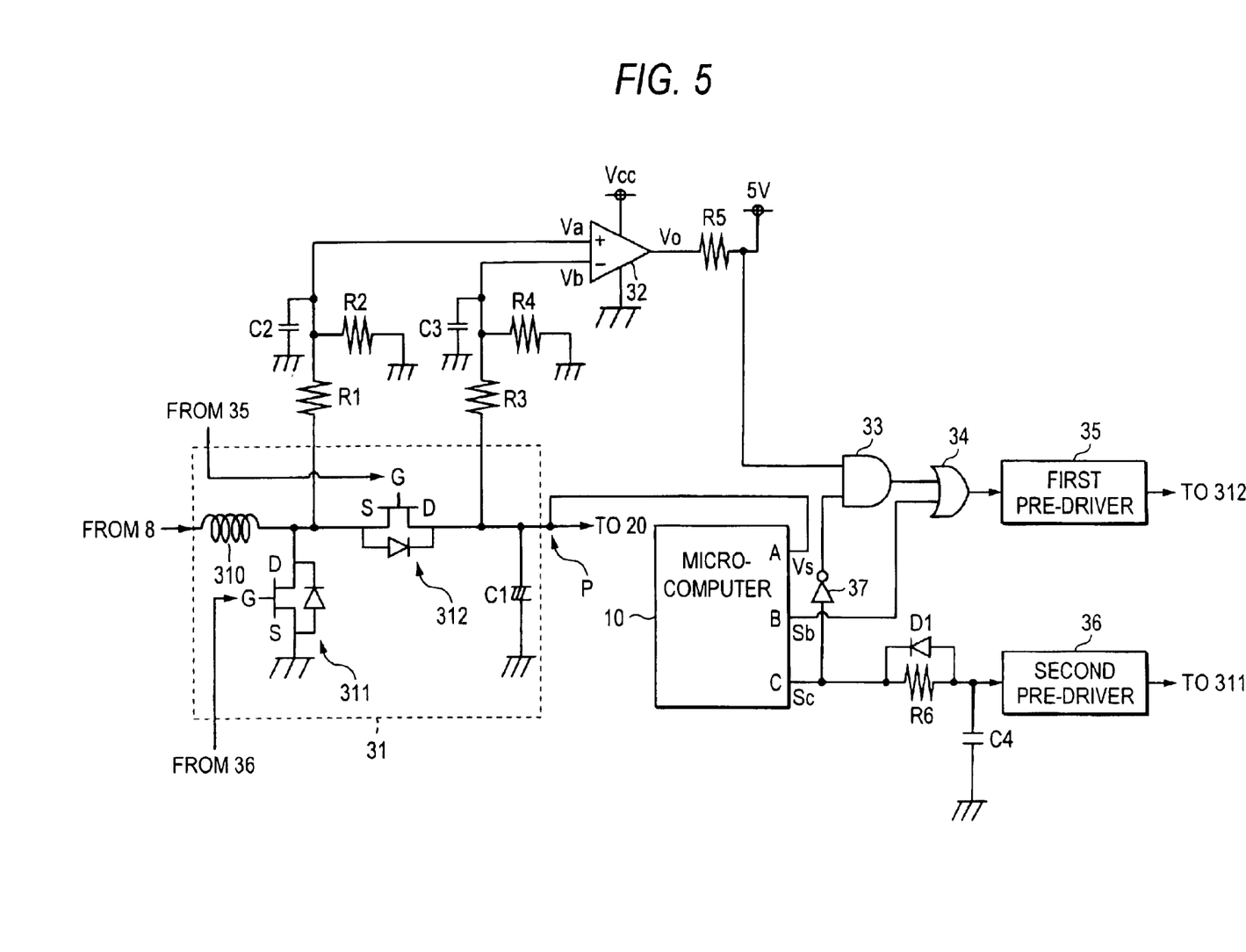
FIG. 5 is a circuit diagram showing the construction of a voltage raising circuit in the embodiment.

The voltage raising circuit 30 includes a main voltage raising section 31, a comparator 32, an AND circuit 33, an OR circuit 34, a first pre-driver 35, a second pre-driver 36, an inverter 37, resistors R1 to R6, capacitors C2 to C4 and a diode D1. The main voltage raising section 31 includes a reactor 310 having a predetermined inductance, a LO-MOS 311 for flowing the electric current to the reactor 310 and interrupting this electric current, a HI-MOS 312 for flowing the electric current from the reactor 310 to the motor driving circuit 20, and a smoothing capacitor C1. These members are connected as shown in FIG. 5. Namely, one end of the reactor 310 is connected to the battery 8, and the other end is connected to the ground through the LO-MOS 311 and is further connected to the motor driving circuit 20 through the HI-MOS 312. The drain terminal of the HI-MOS 312 is connected to the ground through the capacitor C1. Each of the LO-MOS 311 and the HI-MOS 312 is a transistor of the MOS type. The first pre-driver 35 and the second pre-driver 36 are arranged to give suitably adjusted signals to the gates of the corresponding LO-MOS 311 and HI-MOS 312, respectively.

The operation of this main voltage raising section 31 is similar to the operation of the voltage raising circuit using the MOS instead of the diode mentioned above as a conventional example. However, in this embodiment, a signal of an oscillating circuit is not used to operate the transistor, but a pulse width modulating signal (hereinafter called a "PWM signal for MOS driving") Sc changed in pulse width in accordance with the duty ratio calculated by the microcomputer 10 and described later is used. Namely, when the PWM signal Sc for MOS driving at an H-level is given to the gate (G-terminal) of the LO-MOS 311 through the second pre-driver 36, the LO-MOS 311 is turned on for only a predetermined H-level period and the electric current is flowed from the battery 8 to the reactor 310. Thereafter, when the PWM signal Sc for MOS driving at an L-level is given, the LO-MOS 311 is turned off and the electric current flowing through the reactor 310 is interrupted. Further, contrary to the case of the LO-MOS, the HI-MOS 312 operated reciprocally with the LO-MOS 311 is turned on for only a predetermined L-level period. Thus, a high voltage is generated on the drain (D-terminal) side of the turned-on HI-MOS 312 so as to prevent a change in magnetic flux due to the interruption of the electric current. The high voltage generated by repeating such an operation is smoothed by the smoothing capacitor C1 and is given to the motor driving circuit 20.

Figure 6:
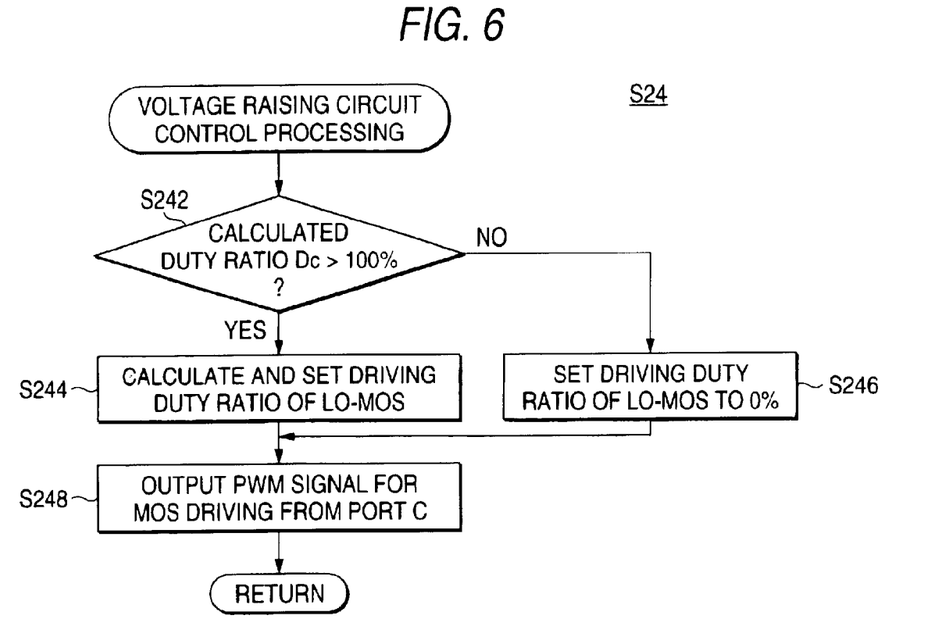
FIG. 6 is a flow chart showing the detailed contents of voltage raising circuit control processing of the microcomputer in the embodiment.

Here, the operation (the voltage raising circuit control processing) of the microcomputer 10 for controlling the operation of the main voltage raising section 31 will be explained. FIG. 6 is a flow chart showing the detailed contents of the voltage raising circuit control processing (the subroutine step S24 of FIG. 4). First, the microcomputer 10 judges whether or not the calculated duty ratio Dc based on the command value V exceeds 100% or a predetermined threshold value close to 100% (step S242).

If the calculated duty ratio Dc exceeds the value, the duty ratio (hereinafter called a "duty ratio for LO-MOS driving" (second command value)) for operating the LO-MOS 311 is calculated by referring to a value corresponding to an excess amount provided by subtracting 100% from the calculated duty ratio Dc (step S244). Thus, if the value corresponding to the excess amount is referred, an insufficient electric current corresponding to the excess amount can be supplied to the motor 6 by the voltage raising operation. If the calculated duty ratio Dc is a predetermined threshold value or less, the duty ratio for LO-MOS driving is set to 0% (step S246). The predetermined threshold value can be appropriately set, and a value closed to and equal to or less than 100% is suitable for the threshold value. The feedback control is performed by performing such branching processing even when the calculated duty ratio Dc exceeds 100%. Therefore, energy loss is restrained to the minimum by setting no voltage raising circuit to be operated until the calculated duty ratio Dc exceeds the vicinity of 100%. When the duty ratio for LO-MOS driving is calculated, a steering state in the vehicle steering such as a motor rotation number, a steering speed, a changing speed of steering torque, etc. may be widely referred instead of the excess amount (the amount exceeding 100%) of the calculated duty ratio Dc. This means that the voltage may be also raised in accordance with a value showing the steering state except for the excess amount of the calculated duty ratio Dc when the calculated duty ratio Dc exceeds 100%.

The microcomputer 10 generates and outputs the PWM signal Sc for MOS driving from a port C by using the duty ratio for LO-MOS driving set as mentioned above (step S248). This PWM signal Sc for MOS driving has a H-level period according to the duty ratio for LO-MOS driving, and the remaining L-level period. When the duty ratio for LO-MOS driving is set to 0%, the signal attains the L-level for all the periods. Here, the PWM signal Sc for MOS driving is generated in the voltage raising circuit control processing (the subroutine step S24 or FIG. 4) in the explanation. However, since the repeating period of a pulse signal is generally short, it is preferable to construct the present processing as an independent process (task) executed in parallel with the processing (or realize the present processing by a new pulse generating circuit), and continuously execute the present processing at high speed.

Figure 7:
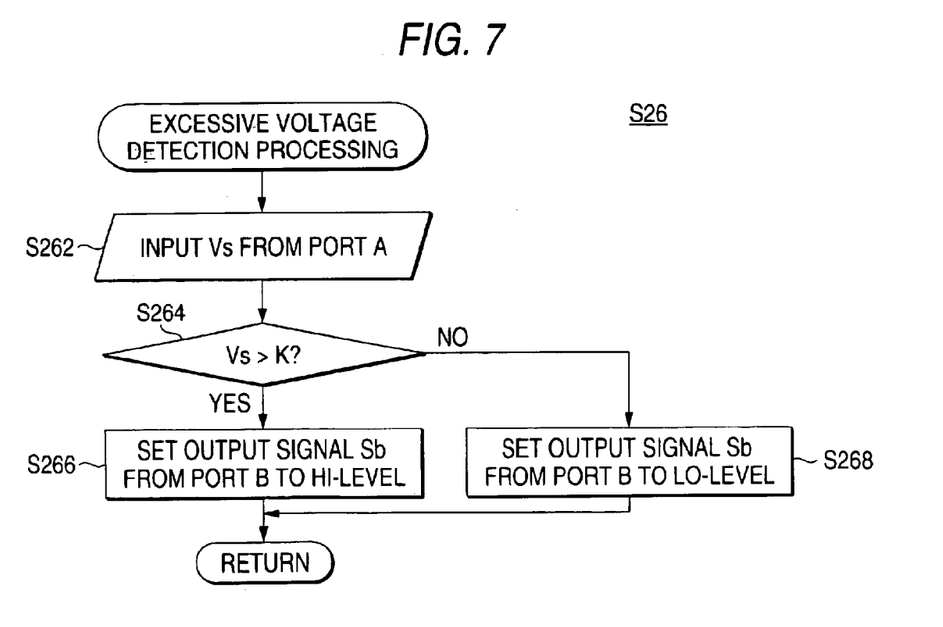
FIG. 7 is a flow chart showing the detailed contents of excessive voltage detection processing of the microcomputer in the embodiment.

Thus, as shown in FIG. 5, the PWM signal Sc for MOS driving output from the port C of the microcomputer 10 is inputted to the second pre-driver 36 through a waveform adjusting circuit constituted by the diode D1, the resistor R6 and the capacitor C4. The logic level of this signal Sc is inverted by the inverter 37 for making a NOT arithmetic calculation, and this signal Sc is input to the first pre-driver 35 through the AND circuit 33 and the OR circuit 34. The operations of the AND circuit 33 and the OR circuit 34 will be described later. Thus, since the logic level of the signal input to the first pre-driver 35 and the logic level of the signal input to the second pre-driver 36 are set to a reciprocal relation by the inverter 37, the LO-MOS 311 and the HI-MOS 312 in the voltage raising circuit 30 are reciprocally operated The operation of the microcomputer 10 (excessive voltage detection processing) will next be described when an excessive voltage is caused. FIG. 7 is a flow chart showing the detailed contents of the excessive voltage detection processing (subroutine step S26 of FIG. 4). First, a voltage Vs supplied from a point P shown in FIG. 5 to the motor is input to a port A of the microcomputer 10 (step S262). An analog-digital (A/D) converting function and a protecting function from the excessive voltage are assembled into the port A so that the supply voltage value Vs to the motor can be obtained by a digital value. Next, the microcomputer 10 judges whether or not the motor attains the electricity generating state and the excessive voltage is caused from comparison of the supply voltage value Vs to the motor and a predetermined value K (step S264). When the excessive voltage is caused by exceeding the predetermined value K, the signal Sb output from a port B is set to the H-level (step S266). In contrast to this, when no excessive voltage is caused, the signal Sb is set to the L-level (step S268). Here, the signal Sb shown in FIG. 5 is input to the first pre-driver 35 through the OR circuit 34. Accordingly, when the signal Sb is at the H-level, the HI-MOS 312 is turned on irrespective of the logic level of another signal inputted to the OR circuit 34. Accordingly, when the excessive voltage is caused, the electric current is fed back to the battery 8 at any time, and the danger of generation of internal damage is prevented in advance.

Next, when the ON-period of the HI-MOS 312 becomes longer than a predetermined time in the voltage raising circuit 30, the electric potential of the source (S-terminal side) becomes lower than that of the drain (D-terminal side). As this result, the phenomenon that the electric current is flowed backward from the drain to the source, is caused. Therefore, it is necessary to set a construction in which heat generation of the MOS is restrained by turning-off the HI-MOS 312 so as not to cause this back flow phenomenon, and no voltage raising efficiency is reduced. Therefore, the voltage raising circuit 30 of FIG. 5 includes the following circuit constructed by using the comparator 32. The operation of this circuit will next be explained.

First, the electric potential of the source (S-terminal side) of the HI-MOS 312 is divided by resistors R1 and R2 and is input to a positive terminal of the comparator 32. This voltage is set to Va. The electric potential of the drain (D-terminal side) is divided by resistors P3 and R4 and is inputted to a negative terminal of the comparator 32. This voltage is set to Vb. The comparator 32 sets an output signal Vo to the H-level if Va−Vb is 0 or more, and also sets the output signal Vo to the L-level if Va−Vb is negative. Accordingly, when the back flow phenomenon is caused, Va−Vb becomes a negative value so that the output signal Vo attains the L-level (the voltage dividing ratio of R1 and R2 and the voltage dividing ratio of R3 and R4 are set to the same).

The signal Vo outputted from the comparator 32 is input to one input terminal of the AND circuit 33 through the resistor R5. The PWM signal Sc for MOS driving is inverted and inputted from a port C of the microcomputer 10 to the other input terminal of the AND circuit 33 (by the inverter 37). As mentioned above, this PWM signal Sc for MOS driving has the H-level period for turning-on the LO-MOS 311 and the L-level period for turning-on the HI-MOS 312. Accordingly, even when the signal Sc at the L-level is output from the microcomputer 10 to turn-on the HI-MOS 312 and is inverted and inputted as a signal at the H-level, the output signal from the AND circuit 33 attains the L-level when the output signal Vo from the comparator 32 attains the L-level by causing the back flow phenomenon. Accordingly, when the back flow phenomenon is caused, the HI-MOS 312 is turned off so that the back flow of the electric current is prevented. When the excessive voltage is detected, the HI-MOS 312 is preferentially turned on by the OR circuit 34 as mentioned above.

Figure 8:
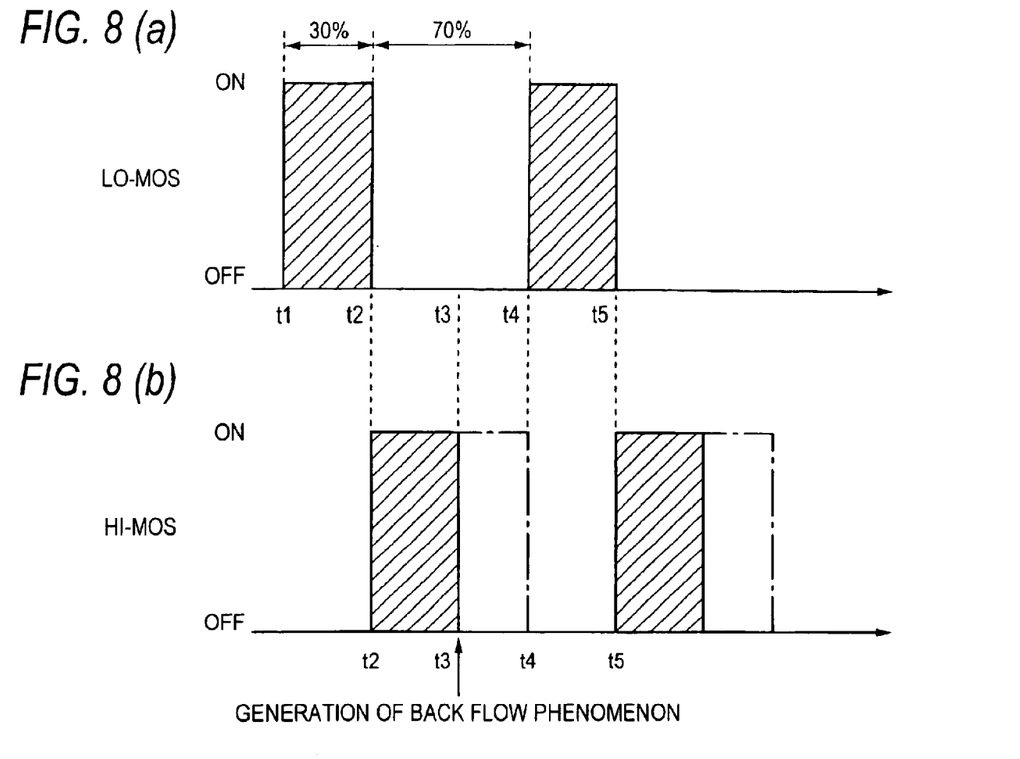
FIG. 8 is a typical view showing the operating states of LO-MOS 311 and HI-MOS 312 at the generating time of a back flow phenomenon in the embodiment.

FIG. 8 is a typical view showing the operating states of the LO-MOS 311 and the HI-MOS 312 when the back flow phenomenon is caused. Here, the duty ratio for LO-MOS driving is set to 30%. Accordingly, the ON-period of the LO-MOS 311 is 30% of the entire period, and the OFF-period is 70% of the entire period. As shown in FIG. 8, the LO-MOS 311 is turned on for the time from t1 to t2, and is turned off for the time from t2 to t4. Further, the HI-MOS 312 operated reciprocally with this LO-MOS 311 is originally turned off for the time from t1 to t2, and is ought to be turned on for the time from t2 to t4, However, since the back flow phenomenon is caused at the time point of the time t3, the output signal Vo from the comparator 32 attains the L-level and the HI-MOS 312 is turned off and is finally turned on for only the time from t2 to t3. Thus, the HI-MOS 312 is operated and the back flow of the electric current from the drain to the source is prevented.

<3. Effect>

In accordance with the embodiment, only when the calculated duty ratio Dc based on the command value V exceeds 100% or a predetermined threshold value close to 100%, the microcomputer 10 calculates the duty ratio for LO-MOS driving, and sets the duty ratio for LO-MOS driving to 0% if the calculated duty ratio Dc is this threshold value or less. Thus, in accordance with the embodiment, switching loss due to the operation of the LO-MOS, etc. can be reduced as much as possible and energy loss can be restrained to the minimum by constructing the voltage raising circuit such that no voltage raising circuit is operated until the calculated duty ratio Dc exceeds a value close to 100%.

In accordance with the embodiment, the microcomputer 10 judges whether or not the motor 6 attains the electricity generating state and the excessive voltage is caused from the supply voltage value to the motor 6. When the excessive voltage is caused, the HI-MOS 312 is turned on by setting the signal Sb outputted from the port B to the H-level irrespective of the logic level of another signal inputted to the OR circuit 34. Thus, in accordance with the embodiment, when the excessive voltage is caused, the electric current is fed back to the battery at any time, and the danger of generation of internal damage can be prevented in advance.

In accordance with the embodiment, when the source electric potential of the HI-MOS 312 becomes higher than the drain electric potential and the back flow phenomenon is caused, the comparator 32 inputs the output signal Vo to the AND circuit 33 as the L-level. Accordingly, even when a signal at the H-level from the microcomputer 10 is inverted and inputted to the AND circuit 33, the output signal from the AND circuit 33 attains the L-level. Thus, in accordance with the embodiment, when the back flow phenomenon is caused, the HI-MOS 312 is turned off. Accordingly, the back flow of the electric current from the drain to the source can be prevented, and heat generation of the MOS and a reduction in voltage raising efficiency due to this back flow phenomenon can be prevented in advance.

What is claimed is:

1. An electrically operated power steering device for giving steering auxiliary force to a steering mechanism of a vehicle by driving an electric motor in accordance with steering torque applied to an operation unit for vehicle steering the electrically operated power steering device comprising:

a steering state detecting unit for detecting a steering state in the vehicle steering;

an electric current detecting unit for detecting an electric current flowed the electric motor and outputting a detecting value of the electric current;

a motor driving unit for driving the electric motor in accordance with a first command value;

a voltage raising unit for raising a voltage to be supplied to the motor driving unit in accordance with a second command value;

a motor driving control unit for calculating a command value for feedback control of the electric motor as the first command value on the basis of a deviation between a target electric current value set on the basis of the steering torque to the electric motor and the detecting value of the electric current flowed to the electric motor, and giving the first command value to the motor driving unit; and a voltage raising control unit for calculating the second command value such that the voltage raising unit is not operated when the calculated first command value is a predetermined threshold value or less, and the voltage raising unit raises the voltage in accordance with an amount by which the calculated first command value exceeds the predetermined threshold value when the calculated first command value exceeds the threshold value, and giving the second command value to the voltage raising unit.

2. The electrically operated power steering device according to claim 1, wherein
the motor driving unit drives the electric motor on the basis of a first PWM signal changed in duty ratio in accordance with the first command value,
the motor driving control unit calculates the duty ratio to be provided for the first PWM signal on the basis of the first command value, and
the voltage raising control unit calculates the second command value such that the voltage raising unit raises the voltage only when the duty ratio calculated by the motor driving control unit exceeds 100% or a predetermined value close to 100%.

3. The electrically operated power steering device according to claim 1, wherein
the voltage raising unit comprises:
a first switching element turned on and off in accordance with a second PWM signal changed in pulse width on the basis of the second command value;
a reactor having a predetermined inductance and connected to a power source at one end and connected to the ground at the other end through the first switching element; and
a second switching element interposed between the reactor and the motor driving unit, and turned on and off complementarily with the first switching element in accordance with the second PWM signal, and
the voltage raising control unit comprises:
a detecting unit for detecting a back flow of the electric current from the motor driving unit to the reactor; and
a back flow preventing unit for compulsorily turning-off the second switching element when the back flow is detected by the detecting unit.

4. The electrically operated power steering device according to claim 1, wherein
the voltage raising unit comprises:
a first switching element turned on and off in accordance with a second PWM signal changed in pulse width on the basis of the second command value;
a reactor having a predetermined inductance and connected to a power source at one end and connected to the ground at the other end through the first switching element; and
a second switching element interposed between the reactor and he motor driving unit, and turned on and off complementarily with the first switching element in accordance with the second PWM signal, and
the voltage raising control unit comprises:
a detecting unit for detecting whether the electric motor is in an electricity generating state or not; and
a feedback unit for compulsorily turning-on the second switching element to feed-back the electric current from the electric motor to the power source when it is detected by the detecting unit that the electric motor is in the electrically generating state.

5. An electrically operated power steering device comprising:
an electric motor for giving steering auxiliary force to a steering mechanism of a vehicle;
a steering state detecting unit for detecting a steering state in a vehicle steering of the vehicle;
a motor drive unit for driving the electric motor;
a motor driving control unit for calculating a target value of an electric current to be supplied to the electric motor on the basis of the steering state detected by the steering state detecting unit and controlling the motor drive unit on the basis of the target value;
a voltage raising unit for raising a voltage to be supplied to the motor drive; unit; and
a voltage raising control unit for driving the voltage raising unit only when the target value exceeds a predetermined value;
wherein the voltage raised by the voltage raising unit is changed in accordance with an excess amount of a duty ratio over 100% or the predetermined value close to 100%.

6. The electrically operated power steering device according to claim 5, further comprising:
an electric current detecting unit for detecting an electric current flowed the electric motor,
wherein the target value is calculated on the basis of the detected steering state and the electric current detected by the electric current detecting unit.

7. The electrically operated power steering device according to claim 5, wherein the motor drive unit is controlled by the PWM signal changed in the duty ratio in accordance with the target value.

8. The electrically operated power steering device according claim 7, wherein when the duty ratio of the PWM signal exceeds 100% or a predetermined value close to 100%, the voltage raising control unit drives the voltage raising unit.

9. A voltage raising circuit for raising a voltage of a power supply, comprising:
a main voltage raising section, comprising:
a first switching element turned on and off in accordance with a PWM signal changed in pulse width on the basis of a command value;
a reactor having a predetermined inductance and connected to a power source at one end and connected to the ground at the other end through the first switching element; and
a second switching element interposed between the reactor and a motor driving unit, and turned on and off complementarily with the first switching element in accordance with the PWM signal; and
a voltage raising control unit for operating the main voltage section according to the command value,
wherein the voltage raising control unit raises the voltage in accordance with an amount by which a calculated first command value exceeds a predetermined threshold value when the calculated first command value exceeds the threshold value.

10. The voltage raising circuit according to claim 9, wherein the first switching element and the second switching element comprise metallic oxide semiconductor (MOS) type transistors.

11. The voltage raising circuit according to claim 9, wherein the voltage raising control unit further comprises:
a detecting unit for detecting a back flow of the electric current from the motor driving unit to the reactor; and
a back flow preventing unit for compulsorily turning-off the second switching element when the back flow is detected by the detecting unit.

12. An electrically operated power steering device comprising the voltage raising circuit according to claim 9.

* * * * *